US010089529B2

United States Patent
Larson et al.

(10) Patent No.: US 10,089,529 B2
(45) Date of Patent: Oct. 2, 2018

(54) SYSTEMS AND METHODS FOR ADAPTIVE SCANNING BASED ON CALCULATED SHADOWS

(71) Applicant: Loveland Innovations, LLC, Alpine, UT (US)

(72) Inventors: Leif Larson, Alpine, UT (US); Jim Loveland, Alpine, UT (US); Dan Christiansen, Alpine, UT (US); Tad Christiansen, Alpine, UT (US); Cam Christiansen, Alpine, UT (US)

(73) Assignee: Loveland Innovations, LLC, Pleasant Grove, UT (US)

( * ) Notice: Subject to any disclaimer, the term of this patent is extended or adjusted under 35 U.S.C. 154(b) by 0 days.

(21) Appl. No.: 15/675,616

(22) Filed: Aug. 11, 2017

(65) Prior Publication Data
US 2018/0129856 A1     May 10, 2018

Related U.S. Application Data

(62) Division of application No. 15/360,630, filed on Nov. 23, 2016, now Pat. No. 9,734,397.
(Continued)

(51) Int. Cl.
*G01C 11/02* (2006.01)
*G06K 9/00* (2006.01)
(Continued)

(52) U.S. Cl.
CPC .......... *G06K 9/0063* (2013.01); *B64C 39/024* (2013.01); *B64D 47/08* (2013.01);
(Continued)

(58) Field of Classification Search
CPC ...... G06K 9/0063; G01C 11/02; H04N 7/185; G06T 7/0053
(Continued)

(56) References Cited

U.S. PATENT DOCUMENTS

| 5,721,691 A | 2/1998 | Wuller |
| 6,037,945 A | 3/2000 | Loveland |

(Continued)

FOREIGN PATENT DOCUMENTS

| WO | 2016/053438 | 4/2016 |
| WO | 2018089268 | 5/2018 |

OTHER PUBLICATIONS

USPTO Notice of Allowance; U.S. Appl. No. 15/388,754; dated Oct. 5, 2017.
(Continued)

*Primary Examiner* — Nam D Pham
(74) *Attorney, Agent, or Firm* — Phillips, Ryther & Winchester; Justin K. Flanagan

(57) ABSTRACT

An unmanned aerial vehicle (UAV) assessment and reporting system may utilize one or more scanning techniques to provide useful assessments and/or reports for structures and other objects. The scanning techniques may be performed in sequence and optionally used to further fine tune each subsequent scan. The system may include shadow elimination, annotation, and/or reduction for the UAV itself and/or other objects. A UAV may be used to determine a pitch of roof of a structure. The pitch of the roof may be used to fine tune subsequent scanning and data capture.

12 Claims, 15 Drawing Sheets

Related U.S. Application Data

(60) Provisional application No. 62/417,779, filed on Nov. 4, 2016.

(51) Int. Cl.
| | |
|---|---|
| *H04N 5/232* | (2006.01) |
| *H04N 1/00* | (2006.01) |
| *B64C 39/02* | (2006.01) |
| *B64D 47/08* | (2006.01) |
| *G05D 1/10* | (2006.01) |
| *G06T 7/38* | (2017.01) |
| *G06T 7/30* | (2017.01) |
| *H04N 7/18* | (2006.01) |
| *G05D 1/00* | (2006.01) |
| *G06K 9/46* | (2006.01) |
| *G06K 9/62* | (2006.01) |
| *G06T 7/00* | (2017.01) |
| *H04N 5/225* | (2006.01) |

(52) U.S. Cl.
CPC ........... *G01C 11/02* (2013.01); *G05D 1/0044* (2013.01); *G05D 1/0088* (2013.01); *G05D 1/0094* (2013.01); *G05D 1/101* (2013.01); *G06K 9/00637* (2013.01); *G06K 9/4604* (2013.01); *G06K 9/6215* (2013.01); *G06T 7/0004* (2013.01); *G06T 7/30* (2017.01); *G06T 7/38* (2017.01); *H04N 1/00204* (2013.01); *H04N 5/2258* (2013.01); *H04N 5/23203* (2013.01); *H04N 5/23216* (2013.01); *H04N 7/185* (2013.01); *B64C 2201/127* (2013.01); *G06T 2207/10032* (2013.01); *G06T 2207/20101* (2013.01); *G06T 2207/20104* (2013.01); *G06T 2207/30108* (2013.01); *G06T 2207/30184* (2013.01)

(58) Field of Classification Search
USPC ........................................................ 348/144
See application file for complete search history.

(56) References Cited

U.S. PATENT DOCUMENTS

| | | | |
|---|---|---|---|
| 6,810,383 | B1 | 10/2004 | Loveland |
| 6,816,819 | B1 | 11/2004 | Loveland |
| 6,826,539 | B2 | 11/2004 | Loveland |
| 6,829,584 | B2 | 12/2004 | Loveland |
| 7,363,157 | B1 | 4/2008 | Hanna |
| 7,447,564 | B2 | 11/2008 | Yasukawa |
| 8,078,436 | B2 | 12/2011 | Pershing |
| 8,170,840 | B2 | 5/2012 | Pershing |
| 8,209,152 | B2 | 6/2012 | Pershing |
| 8,229,768 | B1 | 7/2012 | Hopkins, III |
| 8,345,578 | B2 | 1/2013 | Thoumy |
| 8,346,578 | B1 | 1/2013 | Hopkins, III et al. |
| 8,380,349 | B1 | 2/2013 | Hickman |
| 8,473,125 | B2 | 6/2013 | Rischmuller |
| 8,542,880 | B2 | 9/2013 | Thornberry |
| 8,718,838 | B2 | 5/2014 | Kokkeby |
| 8,818,572 | B1 | 8/2014 | Tofte |
| 8,818,770 | B2 | 8/2014 | Pershing |
| 8,823,732 | B2 | 9/2014 | Adams |
| 8,825,454 | B2 | 9/2014 | Pershing |
| 9,116,003 | B2 | 8/2015 | Khorashadi |
| 9,129,376 | B2 | 9/2015 | Pershing |
| 9,135,737 | B2 | 9/2015 | Pershing |
| 9,152,863 | B1 | 10/2015 | Grant |
| 9,162,753 | B1 | 10/2015 | Panto |
| 9,251,417 | B1 | 2/2016 | Ku |
| 9,501,700 | B2 | 11/2016 | Loveland |
| 9,505,494 | B1 | 11/2016 | Marlow |
| 9,513,635 | B1 | 12/2016 | Bethke |
| 9,563,201 | B1 | 2/2017 | Tofte |
| 9,609,288 | B1* | 3/2017 | Richman ............... H04N 7/183 |
| 9,613,538 | B1 | 4/2017 | Poole |
| 9,618,940 | B1 | 4/2017 | Michini |
| 9,639,960 | B1 | 5/2017 | Loveland |
| 9,734,397 | B1 | 8/2017 | Larson |
| 9,805,261 | B1 | 10/2017 | Loveland |
| 9,823,658 | B1 | 11/2017 | Loveland |
| 9,978,149 | B1 | 5/2018 | Zhang |
| 2002/0013644 | A1 | 1/2002 | Mekemson et al. |
| 2002/0169664 | A1 | 11/2002 | Walker et al. |
| 2003/0033242 | A1 | 2/2003 | Lynch et al. |
| 2003/0210168 | A1 | 11/2003 | Ruszkowski, Jr. |
| 2004/0066917 | A1 | 4/2004 | Yasukawa |
| 2004/0167667 | A1 | 8/2004 | Goncalves |
| 2004/0167861 | A1 | 8/2004 | Hedley |
| 2004/0177373 | A1 | 9/2004 | Kawabe et al. |
| 2005/0267657 | A1 | 12/2005 | Devdhar |
| 2006/0133661 | A1 | 6/2006 | Takeda |
| 2007/0233367 | A1 | 10/2007 | Chen |
| 2009/0201190 | A1 | 8/2009 | Huthoefer |
| 2009/0265193 | A1 | 10/2009 | Collins |
| 2010/0215212 | A1 | 8/2010 | Flakes |
| 2010/0277588 | A1 | 11/2010 | Ellsworth |
| 2010/0277723 | A1 | 11/2010 | Rezac |
| 2012/0237083 | A1 | 9/2012 | Lange |
| 2013/0216089 | A1 | 8/2013 | Chen |
| 2013/0325244 | A1 | 12/2013 | Wang |
| 2014/0153773 | A1 | 6/2014 | Gupta |
| 2014/0168420 | A1 | 6/2014 | Naderhirn |
| 2014/0316614 | A1 | 10/2014 | Newman |
| 2014/0316616 | A1 | 10/2014 | Kugelmass |
| 2014/0324405 | A1 | 10/2014 | Plummer |
| 2014/0336928 | A1 | 11/2014 | Scott |
| 2015/0019267 | A1 | 1/2015 | Prieto |
| 2015/0148955 | A1 | 5/2015 | Chin |
| 2015/0220085 | A1 | 8/2015 | Ohtomo |
| 2015/0348204 | A1 | 12/2015 | Daues |
| 2015/0371346 | A1 | 12/2015 | Frendling |
| 2015/0377405 | A1 | 12/2015 | Down |
| 2016/0004795 | A1 | 1/2016 | Novak |
| 2016/0148363 | A1 | 5/2016 | Phan |
| 2016/0246304 | A1 | 8/2016 | Canoy |
| 2016/0247115 | A1 | 8/2016 | Pons |
| 2016/0253808 | A1 | 9/2016 | Metzler |
| 2016/0272308 | A1 | 9/2016 | Gentry |
| 2016/0292872 | A1 | 10/2016 | Hammond |
| 2016/0301859 | A1 | 10/2016 | Tebay |
| 2016/0307447 | A1 | 10/2016 | Johnson |
| 2016/0321503 | A1 | 11/2016 | Zhou |
| 2016/0327959 | A1 | 11/2016 | Brown |
| 2016/0365825 | A1 | 12/2016 | Poivet |
| 2016/0377424 | A1 | 12/2016 | Clark |
| 2017/0053169 | A1 | 2/2017 | Cuban |
| 2017/0193829 | A1 | 7/2017 | Bauer |
| 2017/0249510 | A1 | 8/2017 | Labrie |
| 2017/0270612 | A1 | 9/2017 | Howe |
| 2017/0270650 | A1 | 9/2017 | Howe |

OTHER PUBLICATIONS

Autonomous MAV—Cues, Cooper Bills et al., IEEE, 978-1-61284-385-8, 2011, pp. 5776-5783.

Unmanned—Monitoring, C. Eschmann et al., ResearchGate, 2012, pp. 1-8.

USPTO Final Office Action; U.S. Appl. No. 15/446,202; dated Nov. 8, 2017.

U.S. Appl. No. 15/796,672, Final Office Action dated Jun. 25, 2018.

U.S. Appl. No. 15/446,202, Notice of Allowance dated Jul. 5, 2018.

U.S. Appl. No. 15/446,202, Non-Final Office Action dated Feb. 22, 2018.

U.S. Appl. No. 15/796,672, Non-Final Office Action dated Dec. 14, 2017.

U.S. Appl. No. 15/708,471, Non-Final Office Action dated Jan. 5, 2018.

USPTO Non-final Office Action; U.S. Appl. No. 15/446,202; dated Jun. 28, 2017.

(56) References Cited

OTHER PUBLICATIONS

USPTO Non-final Office Action; U.S. Appl. No. 15/360,630; dated Apr. 13, 2017.
USPTO Non-final Office Action; U.S. Appl. No. 15/480,310; dated May 15, 2017.
USPTO Non-final Office Action; U.S. Appl. No. 15/388,754; dated May 26, 2017.
USPTO Non-final Office Action; U.S. Appl. No. 15/444,164; dated Apr. 21, 2017.
USPTO Final Office Action; U.S. Appl. No. 15/444,164; dated Jul. 14, 2017.
USPTO Notice of Allowance; U.S. Appl. No. 15/360,641; dated Mar. 17, 2017.
USPTO Notice of Allowance; U.S. Appl. No. 15/360,630; dated Jun. 21, 2017.
PCT Application No. PCT/US2017/059990, International Search Report dated Jan. 29, 2018.
PCT Application No. PCT/US2017/059990, Written Opinion dated Jan. 29, 2018.

* cited by examiner

US 10,089,529 B2

SYSTEMS AND METHODS FOR ADAPTIVE SCANNING BASED ON CALCULATED SHADOWS

TECHNICAL FIELD

This disclosure generally relates to systems and methods for autonomous assessment and data capture relating to property. Specifically, this disclosure relates to methodical and improved image collection, analysis, processing, and reporting using unmanned aerial vehicles.

BRIEF DESCRIPTION OF THE DRAWINGS

Non-limiting and non-exhaustive embodiments of the disclosure are described herein, including various embodiments of the disclosure with reference to the figures listed below.

DETAILED DESCRIPTION

Figure 1A:
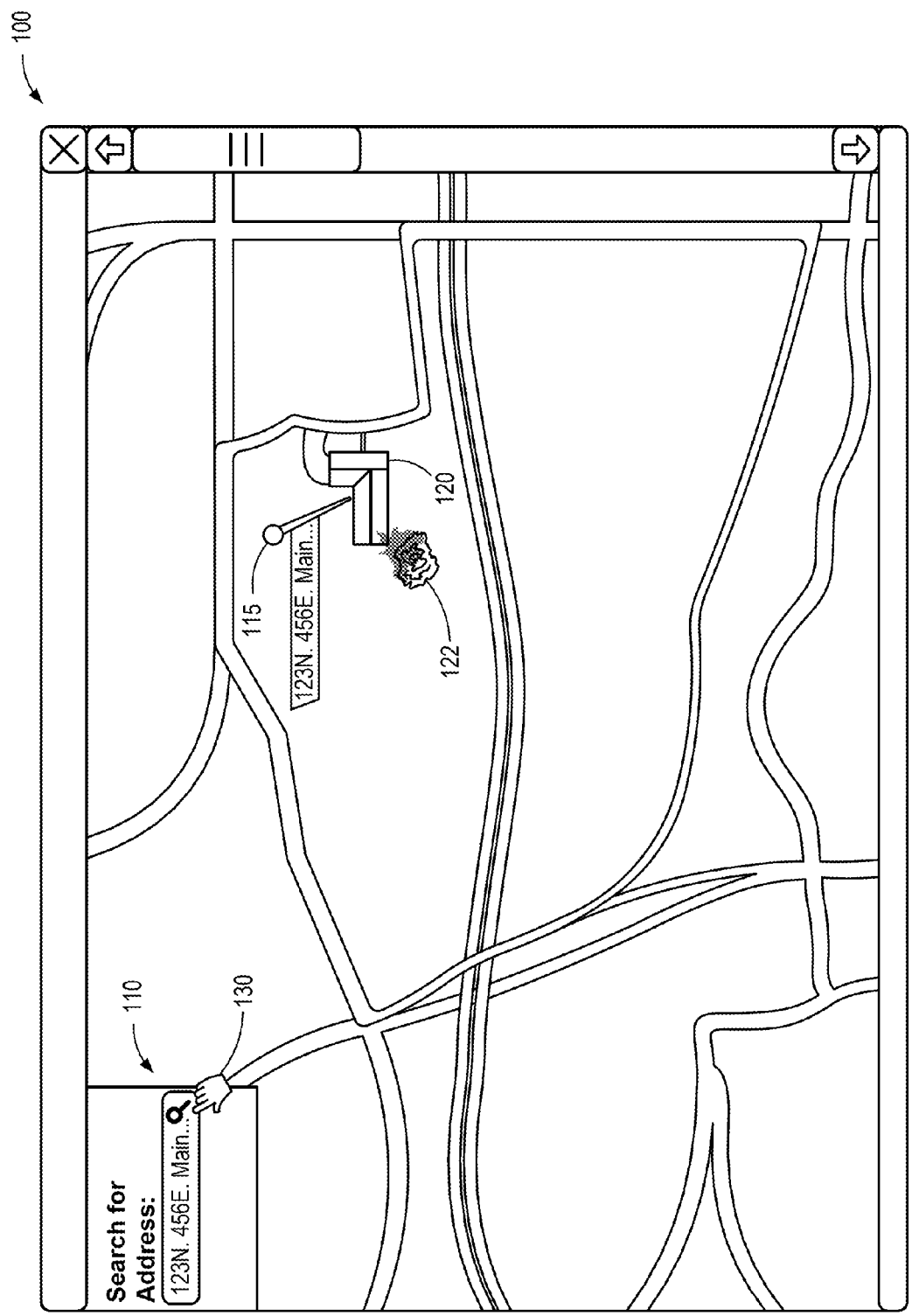
FIG. 1A illustrates a site selection interface to receive an electronic input identifying a location of a structure, according to one embodiment.

This disclosure provides methods and systems for assessing structures and/or other personal property using an unmanned aerial vehicle (UAV). A UAV may carry an imaging system to capture a sequence of images of a target object, such as a structure. The UAV may initially position itself above the location of interest to allow the imaging system to capture a nadir image of an area of interest that includes a target structure. The UAV may subsequently follow a boustrophedonic flight path while the imaging system captures a series of closer images and/or collects non-image scan information. The UAV may subsequently position itself around the structure to collect oblique images at one or more heights on each critical side of the structure and/or the vertex of the structure. To collect partial or full structural information, the UAV may perform a loop scan while the imaging system captures a set of oblique images. For additional detailed images of the area of interest, the UAV and imaging system may perform a series of micro scans. Using the collection of images, a rendering system may generate interactive models of the target structure or other object.

In various embodiments, UAV hardware, firmware, and/or software may be modified, upgraded, and/or programmed to perform the functions, methods, and behaviors described herein. In some embodiments, software, hardware, and/or firmware may be created to interface with pre-existing UAV interfaces. In other embodiments, modifications to one or more portions of a UAV may be made to accomplish the described systems and methods.

Currently, to conduct a site survey a trained technician must be physically present. For example, when an insurance claim is submitted, an insurance agent must travel to the property to assess the damage. Property inspectors also frequently visit structures to manually inspect a property as the result of a homeowner request for an insurance policy quote or a desire to mortgage or refinance a property through a large financial institution. Similarly, solar panel assessment and construction estimates require a trained technician to be on-site. These tasks usually require the trained technician to walk the site, manually photograph the site, and even occasionally climb up on structures for detailed examination. Each technician may perform certain aspects of their jobs differently, resulting in a lack of uniformity. Further, requiring a trained technician to visit sites personally is laborious, dangerous, and/or expensive.

In some embodiments of the present disclosure, a technician may manually operate a UAV to perform one or more assessment tasks. For example, a technician may manually operate a drone to capture photographs that would have required the technician to scale a building. However, this approach may still require a technician to manually operate the UAV and fails to solve the uniformity problem. Some UAVs have semi-autonomous capabilities. These UAVs may be directed to capture photographs of an operator-identified location. However, semi-autonomous UAVs may not capture a comprehensive image collection of the entire site and may not provide adequate information to replace an on-site technician.

A UAV assessment and reporting system described herein provides a comprehensive, automatic (or at least semi-automatic), and methodical approach for assessing a structure or other object for a particular purpose. For example, the types of assessments, reports, and images collected may vary based on a specific use case. Generally, the approaches obviate the need for an industry specific trained technician to be present or at least greatly reduce the workload of a technician.

The UAV assessment and reporting system may comprise a site selection interface to receive an electronic input identifying a location of a structure, a boundary identification interface to receive electronic input identifying geographic boundaries of an area that includes the structure, and a UAV to receive the geographic boundaries and the location of the structure from the site selection interface and conduct a structural assessment. The UAV assessment and reporting system may also include a hazard selection interface to receive electronic input identifying geographic hazards such as above ground power lines, tall trees, neighboring structures, etc. The UAV assessment and reporting system may allow for these hazards to be eliminated from the flight plan to produce a safe path for automated imagery and data capture.

The UAV may include a camera to capture images of the structure, sonar sensors, lidar sensors, infrared sensors, optical sensors, and/or radar sensors. The UAV may include an onboard processor and/or a communication interface to communicate with the controller and/or the interface's cloud-based processing. The UAV may include a non-transitory computer-readable medium for receiving and storing instructions that, when executed by the processor, cause the UAV to conduct a structural assessment. The structural assessment may include a boustrophedonic scan of the area defined by geographic boundaries that includes the structure. The boustrophedonic scan may include capturing images during a boustrophedonic flight pattern within a first altitude range. The boustrophedonic scan may also or alternatively include determining distances to a surface for each of a plurality of potential vertical approaches within the area defined by the geographic boundaries. The UAV assessment and reporting system may include identifying a structure on the site based on the identified geographic boundaries and/or the boustrophedonic scan of the area. The UAV assessment and reporting system may additionally or alternatively include a loop scan of the structure. The loop scan may include a second flight pattern for the UAV to travel around the perimeter of the structure. The second flight pattern may be at a second altitude range lower than the first altitude range. Finally, the UAV assessment and reporting system may additionally or alternatively include a micro scan of the structure in a third flight pattern that includes vertical approaches proximate the structure to capture detailed images of the structure.

In one embodiment, a site may be identified and the UAV may fly to the site and capture a collection of high resolution images following a comprehensive and methodical autonomous flight pattern. In another embodiment, an unskilled operator may take the UAV to the site, and capture a collection of high resolution images with little to no training. The UAV system may automatically conduct the assessment via an autonomous flight pattern. Based on the assessment or report selected, a UAV assessment and reporting system may determine the appropriate flight pattern, types of images to be captured, number of images to be captured, detail level to be captured, attributes to be identified, measurements to be made, and other assessment elements to be determined.

The UAV assessment and reporting system may use a satellite and/or aerial image to initially identify a site to analyze. In one embodiment, a site selection interface on the operator client may present a satellite image. The site selection interface may receive, from the operator, an electronic input identifying a location of a structure. The operator client may be a controller, computer, phone, tablet, or other electronic device. The operator may mark, via an electronic input on a boundary identification interface, one or more geographic boundaries associated with the structure and/or site. The operator may also identify, on the operator client, obstacles, boundaries, structures, and particular points of interest.

For example, an operator who is attempting to scan a residential lot may be presented with a satellite image on his phone. The operator may select each corner of the lot to identify the boundaries of the lot. The operator may then drag his finger along the border of a house on the lot to mark the perimeter of the house. Further, if the lot has trees or other obstacles, the operator may press and hold to identify their location and enter an estimated height. The operator may also circle certain areas on the satellite image to identify particular points of interest. For instance, if the operator is collecting images for an insurance claim on a house that has had its fence blown over by a recent microburst, the operator may circle the fence for a closer inspection and data capture.

In an alternative embodiment, the UAV assessment and reporting system may automatically identify obstacles, boundaries, structures, and particular points of interest using satellite images, county records, topographical maps, and/or customer statements. For example, the UAV assessment and reporting system may receive an address of a commercial property to be assessed for damage caused by a tornado. The UAV assessment and reporting system may use available county records to determine the boundary of the property, and topographical maps of the area to identify objects and structures. Further, if a customer submits a claim stating that the entry of a warehouse on the site has collapsed, the UAV assessment and reporting system may receive and parse the submitted claim to identify the entrance as a particular point of interest. Alternatively, a technician or other user may electronically identify the entrance on a map or satellite image.

After the site is identified, the UAV may receive the location of the structure and the identified geographic boundaries. The UAV may first take a nadir image (i.e., top down) of the entire site. The UAV assessment and reporting system may use the nadir image to align the UAV with landmarks established in the initial identification of the site and structure. The UAV assessment and reporting system may also use the nadir image to generate a flight pattern or adjust a predefined flight pattern to ensure accuracy and uniformity. The flight pattern may include three flight stages: (1) a boustrophedonic scan, (2) a loop scan, and (3) a micro scan. In some embodiments, a structural assessment may require only one or two of the three types of scans.

During a first scan stage, the UAV may perform a boustrophedonic scan. During the boustrophedonic scan, the UAV may follow a flight pattern where the UAV travels from edge to edge of the site in alternating offset zones. The camera on the UAV may capture images of the site as the UAV travels in its boustrophedon pattern. The UAV assessment and reporting system may merge the images to form a detailed aerial view of the site. The level of detail in the detailed aerial view may be improved by lowering the altitude of the UAV and using minimal offsets. However, the altitude used for a boustrophedonic scan may be limited due to the height of structures and obstacles on the site.

During a second scan stage, the UAV may perform a loop scan to analyze the angles of a structure. The loop scan may include a flight pattern that positions the UAV at the perimeter of the structure and/or the site. The loop scan may include the UAV traveling around the perimeter. As the UAV travels around the perimeter, the UAV may lower its altitude and the camera captures images of the structure at one or more angles. The angles may be oblique or perpendicular to the walls of the structure. The UAV assessment and reporting system may use these images to create a three-dimensional model of the structure. In one embodiment, the UAV may make multiple passes around the perimeter of the structure at different altitudes. For example, the UAV may fly around the perimeter at a first altitude to capture images of the structure at a first angle, and then fly around the perimeter at a second altitude to capture additional images of the structure at a second angle. The number of passes around the perimeter and the lowering of UAV altitude after each pass may vary based on a desired assessment or report. Each additional pass may provide more accurate structural images for a three-dimensional model, construction assessment, solar panel installation assessment, and/or damage assessment.

During a third scan stage, the UAV may perform a micro scan for close up photos of a structure or other areas of interest. The micro scan over the surface of the structure may provide detailed images for assessing the structure and/or other personal property. The granularity from the micro scan may assist in detailed measurements, damage identification, and material identification. For example, the micro scan may allow an insurance adjuster to zoom in on a 3D model of the structure to view and assess a small patch of roof that has been damaged, identify a stucco color or a material of a structure, etc.

In one embodiment, to perform the micro scan, the UAV may perform a series of vertical approaches near the structure. During the micro scan, the UAV may utilize a base altitude that is higher than at least a portion of the structure or other personal property of interest. The UAV may begin in a starting position at the base altitude and lower its altitude until it is at a target distance from the structure. In one embodiment, the camera on the UAV may capture an image when the target distance is reached. In another embodiment, the camera may take a set of images as the UAV lowers in altitude. After the image at the target distance is captured, the UAV may return to the base altitude and travel a target lateral distance and once again lower its altitude until it is at a target distance from the structure. The target lateral distance may be determined based on the area of the structure captured by each image. In some embodiments, the images may slightly overlap to ensure coverage of the entire structure. The UAV may continue to perform vertical approaches separated by the target lateral distance until the entire structure has been covered or a specified portion of the structure has been assessed.

In another embodiment, to perform the micro scan, the UAV may traverse the surface of a structure or other personal property at a target lateral distance and the camera may capture images as the UAV travels in a boustrophedonic or circular pattern. To avoid a collision, the UAV may use the angled images from the loop scan to determine any slope or obstacle on the surface.

In one embodiment, the UAV may include proximity sensors. The proximity sensors may be used to avoid obstacles on and surrounding the structure and thereby identify safe flight areas above and proximate the structure and surrounding objects. The safe flight areas are locations where the UAV may fly very close to the structure and capture images. The proximity sensors may also be used to determine how close the UAV is to the structure. For example, a UAV may be programmed to capture images at a distance of five feet from the structure. The proximity sensors may send a signal indicating to the UAV that it has reached the target distance, five feet, and the camera may take a photograph in response to the signal. The target distance may be adjusted based on desired detail, weather conditions, surface obstacles, camera resolution, camera field of view, and/or other sensor qualities. In some embodiments, infrared and other non-optical sensors may be used to provide additional assessment data. For example, materials may be identified based on a spectral analysis and/or damage may be identified based on infrared leaks in a structure.

In other embodiments, the UAV may use additional and/or alternative methods to detect proximity to obstacles and the structure. For example, the UAV may use topographical data. As another example, the UAV may have a sonar system that it uses to detect proximity. As yet another example, the UAV may determine the proximity to the structure based on the angled images from the loop scan. For instance, the UAV assessment and reporting system may calculate the height of walls based on the angled images and determine an altitude that is a target distance above the height of the walls to descend for each image capture.

The location of the micro scan may be determined in a variety of ways. In one embodiment, the micro scan may include an assessment of the entire structure as identified by the operator. In another embodiment, the micro scan may include an assessment of only a portion of interest identified by the operator. For example, for a solar panel installation or construction assessment on or near a structure, a micro scan and/or loop scan may be needed for only a portion of the structure. In yet another embodiment, the UAV assessment and reporting system may intelligently identify portions of interest during one or both of the first two scanning stages and only micro scan those areas.

Additionally in some embodiments, the UAV assessment and reporting system may perform multiple micro scans with different levels of resolution and/or perspective. For example, a first micro scan may provide detailed images at 10 or 20 feet above a roof. Then a second micro scan may image a portion of the roof at five feet for additional detail of that section. This may allow a faster capture of the roof overall while providing a more detailed image set of a portion of interest. In one embodiment, the UAV assessment and reporting system may use the first micro scan to determine the portion to be imaged in the second micro scan.

In some embodiments, the UAV assessment and reporting system may use each scan stage to improve the next scan stage. For example, the first scan stage may identify the location of objects. Sonar or optical sensors may be used in the first scan stage to identify the height of the objects and/or physical damage. The location and height of the objects identified in the first scan stage may determine where the loop scan occurs and the altitude at which the angled photographs are taken. Further, the first and second stages may identify particular points of interest. The third stage may use the particular points of interest to determine the location of the micro scans. For example, during a loop scan, the autonomous flying system may identify wind damage on the east surface of a structure. The micro scan may then focus on the east surface of the structure. The identification of particular points of interest may be done using UAV onboard image processing, server image processing, or client image processing.

The UAV assessment and reporting system may automatically calculate a pitch of a roof. In a first embodiment, the UAV assessment and reporting system may use the UAV's sonar or object detection sensors to calculate the pitch of the roof. For example, the UAV may begin at an edge of the roof and then travel toward the peak. The pitch may then be calculated based on the perceived Doppler effect as the roof becomes increasingly closer to the UAV as it travels at a constant vertical height. In a second embodiment, the UAV may land on the roof and use a positioning sensor, such as a gyroscope, to determine the UAV's orientation. The UAV assessment and reporting system may use the orientation of the UAV to determine the slope.

In some embodiments, a UAV may hover above the roof but below a peak of the roof. Sensors may determine a vertical distance to the roof below and a horizontal distance to the roof, such that the roof represents the hypotenuse of a right triangle with the UAV positioned at the 90-degree corner of the right triangle. A pitch of the roof may be determined based on the rise (vertical distance downward to the roof) divided by the run (horizontal forward distance to the roof).

In some embodiments, a UAV may hover above the roof at a first location and measure a vertical distance from the UAV to the roof (e.g., downward). In one such embodiment, a downward sensor may be used. The UAV may then move horizontally to a second location above the roof and measure the vertical distance from the UAV to the roof. Again, the roof becomes the hypotenuse of a right triangle, with one side of the triangle corresponding to the horizontal difference between the first location and the second location, and the second side of the triangle corresponding to the vertical difference between the distance from the UAV to the roof in the first location and the distance from the UAV to the roof in the second location.

In some embodiments, a UAV may hover above the roof at a first location and measure a horizontal distance from the UAV to the roof. In such embodiments, a forward, lateral, and/or reverse, sensor may be used. The UAV may then move vertically to a second location above the roof and measure the horizontal distance from the UAV to the roof. Again, the roof becomes the hypotenuse of a right triangle, with one side of the triangle corresponding to the vertical difference between the first location and the second location, and the second side of the triangle corresponding to the horizontal difference between the distance from the UAV to the roof in the first location and the distance from the UAV to the roof in the second location.

In some embodiments, the UAV assessment and reporting system may use three or more images and metadata associated with those images to calculate the pitch of the roof. For example, the UAV may capture a first image near the roof. The UAV may then increase its altitude and capture a second image above the first image. The UAV may then fly laterally towards the peak of the roof until the proximity of the UAV to the roof is the same as the proximity of the first image. The UAV may then capture a third image. Each image may have metadata associated with it including GPS coordinates, altitude, and proximity to the house. The UAV assessment and reporting system may calculate the distance of the roof traveled based on the GPS coordinates and altitude associated with the three images using the Pythagorean theorem. The UAV assessment and reporting system may then calculate the pitch by taking the ratio of the altitude and the distance of the roof traveled.

In some embodiments, to maintain stationary a UAV may have to tilt the body and/or one or more propellers to compensate for wind or other environmental factors. For various measurements and scans described herein, the images, measurements, and/or other captured data may be annotated to identify the tilt or angle caused by the UAV tilt. In other embodiments, the sensors, cameras, and other data capture tools may be mechanically or digitally adjusted, such as gyroscopically for example. In some embodiments, measurements, such as distances when calculating skew and/or roof pitch, may be adjusted during calculations based on identified UAV tilt due to environmental factors.

The UAV may use the calculated pitch to adjust the angle of the camera to reduce image skew during a micro scan and/or loop scan. For example, once the pitch is calculated the UAV may perform a micro scan with the camera at a perpendicular angle to the roof and/or de-skew the image using software on the UAV, during post-imaging processing, and/or through cloud-based processing. In various embodiments, the calculated pitch is used to angle the camera so it is perpendicular to the roof to eliminate skew.

In some embodiments, a pitch determination system may determine a pitch of the roof based on at least two distance measurements, as described above, that allow for a calculation of the pitch. An imaging system of the UAV may capture an image of the roof of the structure with the optical axis of the camera aligned perpendicular to a plane of the roof of the structure by adjusting a location of the UAV relative to a planar surface of the roof and/or a tilt angle of the camera of the UAV.

The UAV assessment and reporting system may also reduce and/or identify shadows in the images by calculating the current angle of the sun. The UAV assessment and reporting system may calculate the angle of the sun based on the time of the day, the day of the year, and GPS location. To eliminate the UAV's shadow from appearing in captured images, the UAV assessment and reporting system may apply the angle of the sun to the current UAV position in flight. The UAV position, the angle/position of the sun, and the relative location of surfaces and structures (e.g., roof) may determine precisely where the shadow of the UAV will appear. The UAV may adjust its position and camera based on the location of the roof shadow to ensure that each photograph will be captured in such a way as to completely eliminate the UAV's shadow.

In some embodiments, the UAV assessment and reporting system may also use the angle of the sun to determine the best time of day to photograph a site or portion of a site. For example, the shadow of an object on a site may obscure a structure during the morning. Based on the angle of the sun, the UAV assessment and reporting system may determine what time of day the shadow would no longer obscure the structure. The UAV may autonomously collect images during different times of day to ensure that shadow-free images of all, most, or specific portions of the structure are captured during boustrophedonic, loop, and/or micro scans.

For example, a UAV assessment system for imaging a structure may utilize a site selection user interface to receive an electronic input from a user identifying a geographic location of a structure, as previously described. The selection may, for example, be based on one or more of a user input of a street address, a coordinate, and/or a satellite image selection. The UAV may utilize one or more cameras to image the structure (multiple cameras may be used to capture three-dimensional images if desired). A shadow determination system (onboard or cloud-based) may calculate a location of a shadow of the UAV on the structure based on the relative position of the UAV and the sun. A shadow avoidance system may adjust a location of the UAV as it captures images of the structure to ensure that the shadow of the UAV is not in any of the images.

In other embodiments, as described above, the UAV may include a proximate object determination system to identify at least one object proximate the structure, such as a tree, telephone pole, telephone wires, other structures, etc., that are proximate the structure to be imaged. A shadow determination system (local or remote) may calculate (as opposed to directly observe) a location of a shadow cast by the proximate object onto the structure based on a current location of the sun, which can be accurately determined based on a current time and a GPS location of the structure. The imaging system may account for the shadow by (1) annotating images of the structure that include the calculated shadow, (2) adjusting an exposure of images of the structure that include the calculated shadow, and/or (3) identifying a subsequent time to return to the structure to capture non-shadowed images of the portions of the structure that are currently shadowed.

The UAV, server, and operator client may be connected via one or more networks. For example, the UAV may transmit images to the server via a cellular network. Additionally, the UAV may connect to the client via a second network such as a local wireless network. The UAV, server, and operator client may each be directly connected to each other, or one of the elements may act as a gateway and pass information received from a first element to a second element.

A standard flight plan may be saved on the server. The standard flight plan may be loaded on the UAV and altered based on information entered by the operator into the operator client interface. The UAV (e.g., via onboard or cloud-based processors) may also alter the standard flight plan based on the images captured and/or other sensor data.

Some of the infrastructure that can be used with embodiments disclosed herein is already available, such as: general-purpose computers, computer programming tools and techniques, digital storage media, and communications networks. A computer may include a processor, such as a microprocessor, microcontroller, logic circuitry, or the like. The processor may include a special-purpose processing device, such as an ASIC, a PAL, a PLA, a PLD, a CPLD, a Field Programmable Gate Array (FPGA), or other customized or programmable device. The computer may also include a computer-readable storage device, such as non-volatile memory, static RAM, dynamic RAM, ROM, CD-ROM, disk, tape, magnetic memory, optical memory, flash memory, or other computer-readable storage medium.

Suitable networks for configuration and/or use, as described herein, include any of a wide variety of network infrastructures. Specifically, a network may incorporate landlines, wireless communication, optical connections, various modulators, demodulators, small form-factor pluggable (SFP) transceivers, routers, hubs, switches, and/or other networking equipment.

The network may include communications or networking software, such as software available from Novell, Microsoft, Artisoft, and other vendors, and may operate using TCP/IP, SPX, IPX, SONET, and other protocols over twisted pair, coaxial, or optical fiber cables, telephone lines, satellites, microwave relays, modulated AC power lines, physical media transfer, wireless radio links, and/or other data transmission "wires." The network may encompass smaller networks and/or be connectable to other networks through a gateway or similar mechanism.

Aspects of certain embodiments described herein may be implemented as software modules or components. As used herein, a software module or component may include any type of computer instruction or computer-executable code located within or on a computer-readable storage medium, such as a non-transitory computer-readable medium. A software module may, for instance, comprise one or more physical or logical blocks of computer instructions, which may be organized as a routine, program, object, component, data structure, etc., that perform one or more tasks or implement particular data types, algorithms, and/or methods.

A particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network.

The embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Further, those of skill in the art will recognize that one or more of the specific details may be omitted, or other methods, components, or materials may be used. In some cases, operations are not shown or described in detail. Thus, the following detailed description of the embodiments of the systems and methods of the disclosure is not intended to limit the scope of the disclosure, as claimed, but is merely representative of possible embodiments.

FIG. 1A illustrates a site selection interface 100 to receive an electronic input 110 identifying a location 115 of a structure 120. A client device may present the site selection interface 100 to an operator, and the operator may identify the location 115 by entering an address and selecting 130 the search function. As shown, the electronic input 110 may be an address entered by an operator. In another embodiment, the operator may enter GPS coordinates. In yet another embodiment, the operator may select the location 115 with a gesture or based on a selection within the map view.

The site selection interface 100 may also receive an electronic input 110 identifying any obstacles 122. For example, an operator may identify a tree, a shed, telephone poles, or other obstacle using a gesture within the site selection interface 100. In some embodiments, the site selection interface 100 may request an estimated height of the obstacle 122. In other embodiments, the site selection interface 100 may request the object type then estimate the height of the obstacle 122 based on the object type. For instance, a standard telephone pole is 40 feet tall. If an operator identified an obstacle 122 on the site to be a telephone pole, the site selection interface 100 may estimate the height to be 40 feet.

Figure 1B:
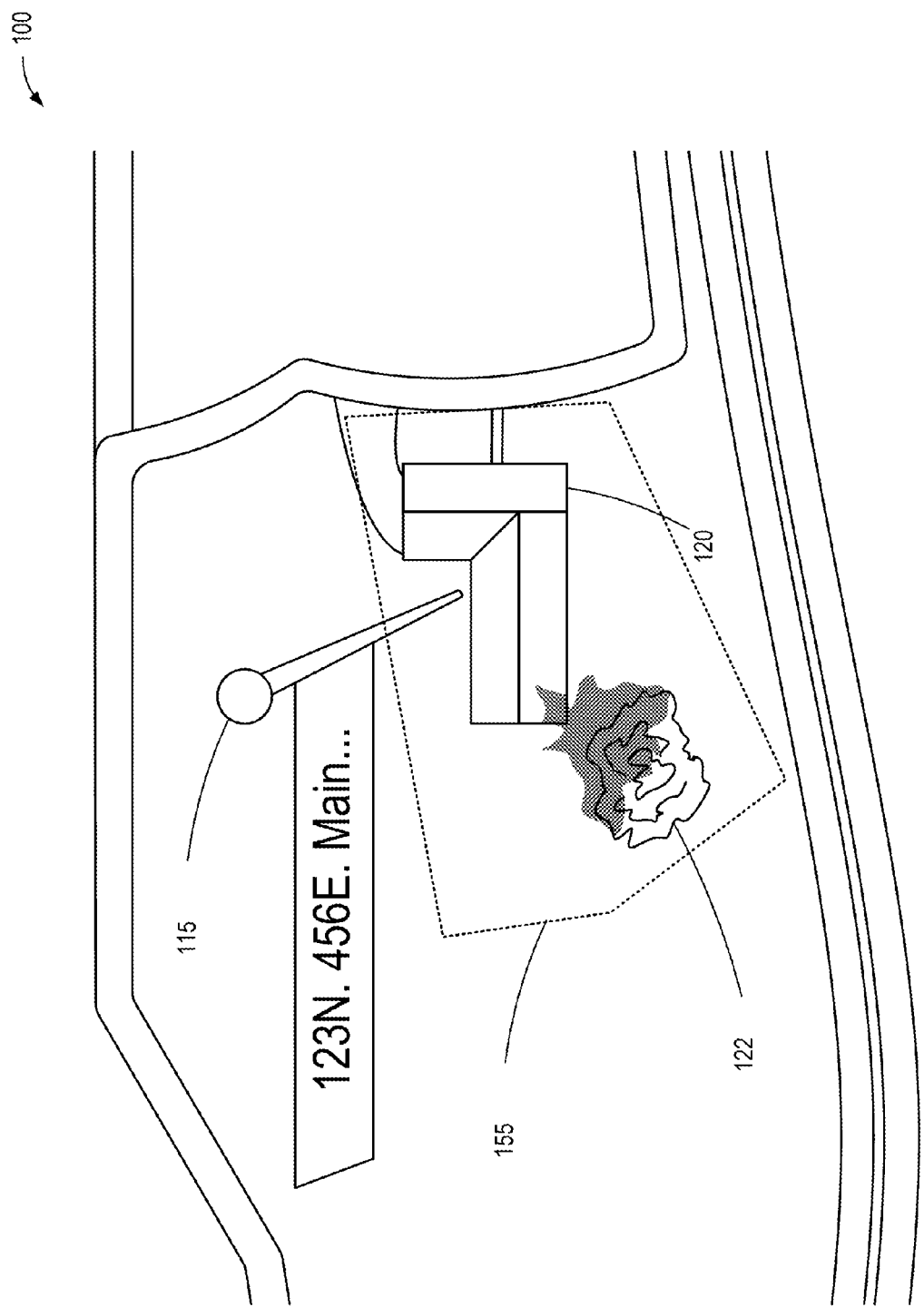
FIG. 1B illustrates parcel boundaries associated with the location identified in FIG. 1A, according to one embodiment.

FIG. 1B illustrates parcel boundaries 155 associated with the location 115 identified in FIG. 1A. In various embodiments, parcel information may be determined using aerial photos, satellite images, government records, plot maps, and/or the like.

Figure 2:
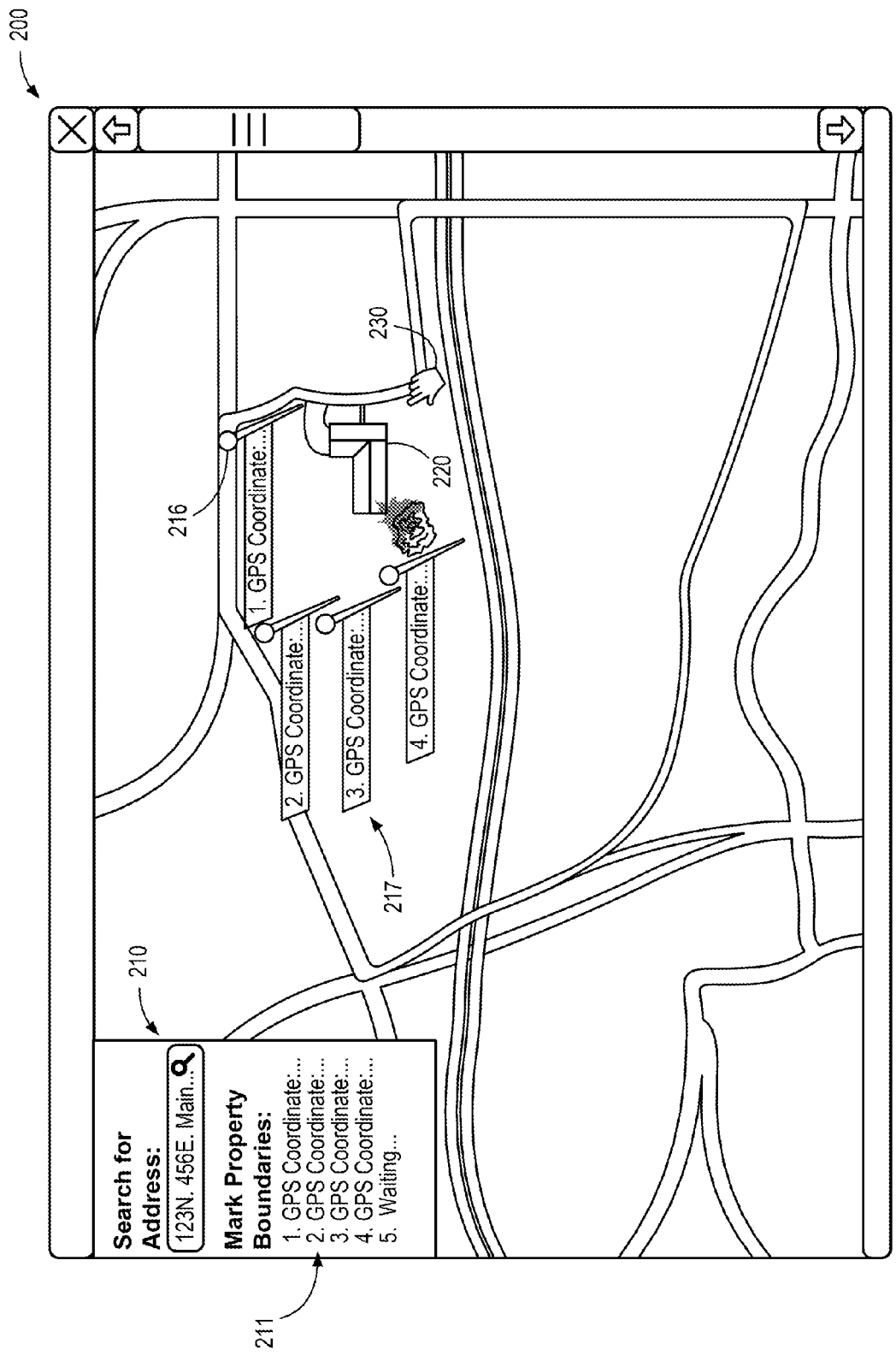
FIG. 2 illustrates a boundary identification interface to receive electronic input identifying geographic boundaries of an area that includes the structure, according to one embodiment

FIG. 2 illustrates a boundary identification interface 200 to receive electronic input 230 identifying geographic boundaries 217 of an area that includes the structure 220. The geographic boundaries 217 provide an area for the UAV assessment and reporting system to analyze.

To enter the geographic boundaries 217 of the area, an operator may provide electronic input 230 identifying a location on the boundary identification interface 200. As shown, the electronic input 230 may be a mouse click. The electronic input 230 may also be a gesture entered via a touch screen. Additionally, the operator may enter an address or GPS coordinate in an address bar 210.

The electronic inputs 230 provided by the operator may be marked with a pin 216. The pins 216 may be associated with GPS coordinates, and may be placed in corners of the site. The boundary identification interface 200 may automatically form a boundary line between each pin 216. The placement of the pins 216 may be adjusted through the electronic input 230. For example, the operator may select and drag a pin 216 to a new location if the old location was inaccurate. The boundary identification interface 200 may also display the placement of the current pin 216 in a preview window 211.

Figure 3A:
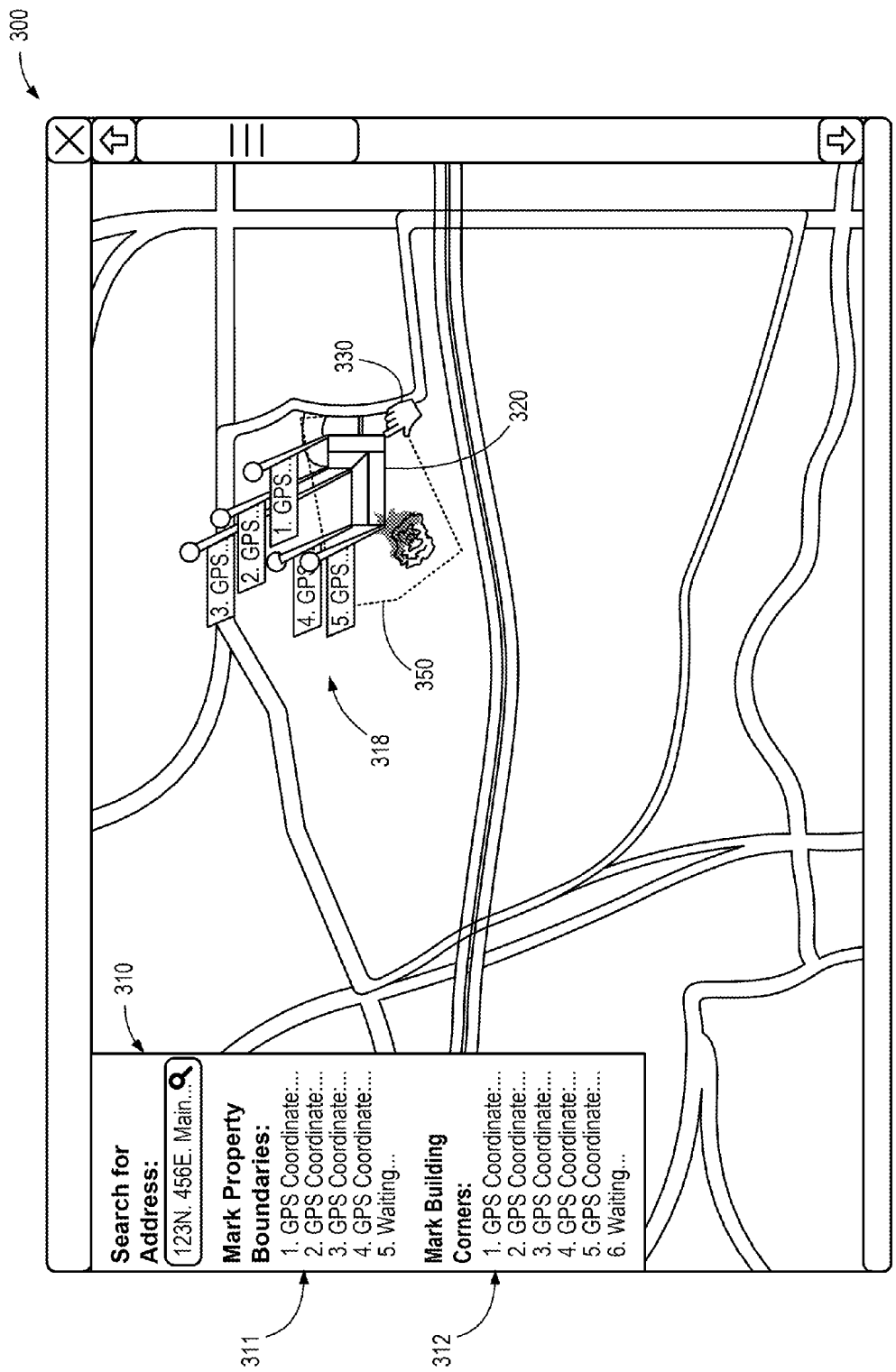
FIG. 3A illustrates a structure identification interface, according to one embodiment.

FIG. 3A illustrates a structure identification interface 300 to receive electronic input 330 identifying structural boundaries 318 of a structure 320. The structural boundaries 318 identify the corners of the structure 320 for the UAV assessment and reporting system to analyze.

To enter the structural boundaries of the structure 320, an operator may provide electronic input 330 identifying a location on the structure identification interface 300. As shown, the electronic input 330 may be a mouse click. The electronic input 330 may also be a gesture entered via a touch screen. Additionally, the operator may enter an address or GPS coordinate in an address bar 310.

Boundary lines 350 formed by the boundary identification interface 200 of FIG. 2 may be displayed on the structure identification interface 300. In some embodiments, any electronic input allowed to be entered in the structure identification interface 300 is limited to the area within the boundary lines 350. In other embodiments, the structure identification interface 300 may present an alert if a structural boundary 318 is located outside of the boundary lines 350. In yet other embodiments, the structure identification interface 300 may adjust the boundary lines 350 if a structural boundary 318 is located outside of the boundary lines 350. The structure identification interface 300 may also display a current property boundary 311.

The electronic inputs 330 provided by the operator may be marked with pins. The pins may be associated with GPS coordinates, and may be placed in corners of the site. The structure identification interface 300 may automatically form a boundary structure line between each pin. The placement of the pins may be adjusted through the electronic input 330. For example, the operator may select and drag a pin to a new location if the old location was inaccurate. The structure identification interface 300 may also display the current pin placement in a preview window 312.

Figure 3B:
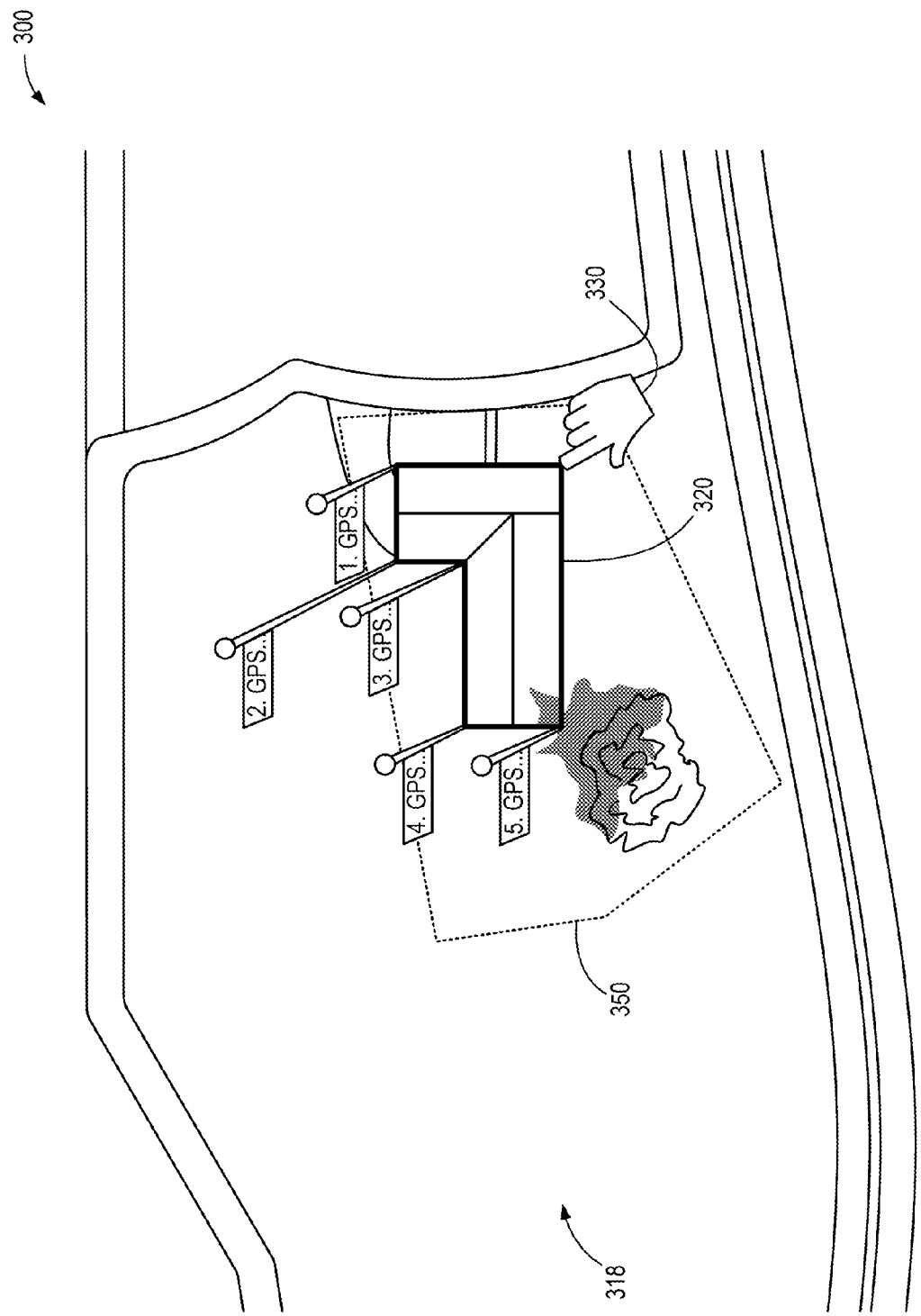
FIG. 3B illustrates a close-up view of the parcel boundaries and the structure identified in FIG. 3A, according to one embodiment.

FIG. 3B illustrates a close-up view of the parcel boundaries 350 and the structure 320 identified in FIG. 3A by GPS markers. The structure 320 which may be partially or fully defined by the operator is illustrated in bold lines. In some embodiments, the system may utilize the markers in combination with an image (e.g., aerial or satellite) to intelligently identify the structure 320. In other embodiments, an operator of the system may fully identify the outline of the structure.

Figure 4:
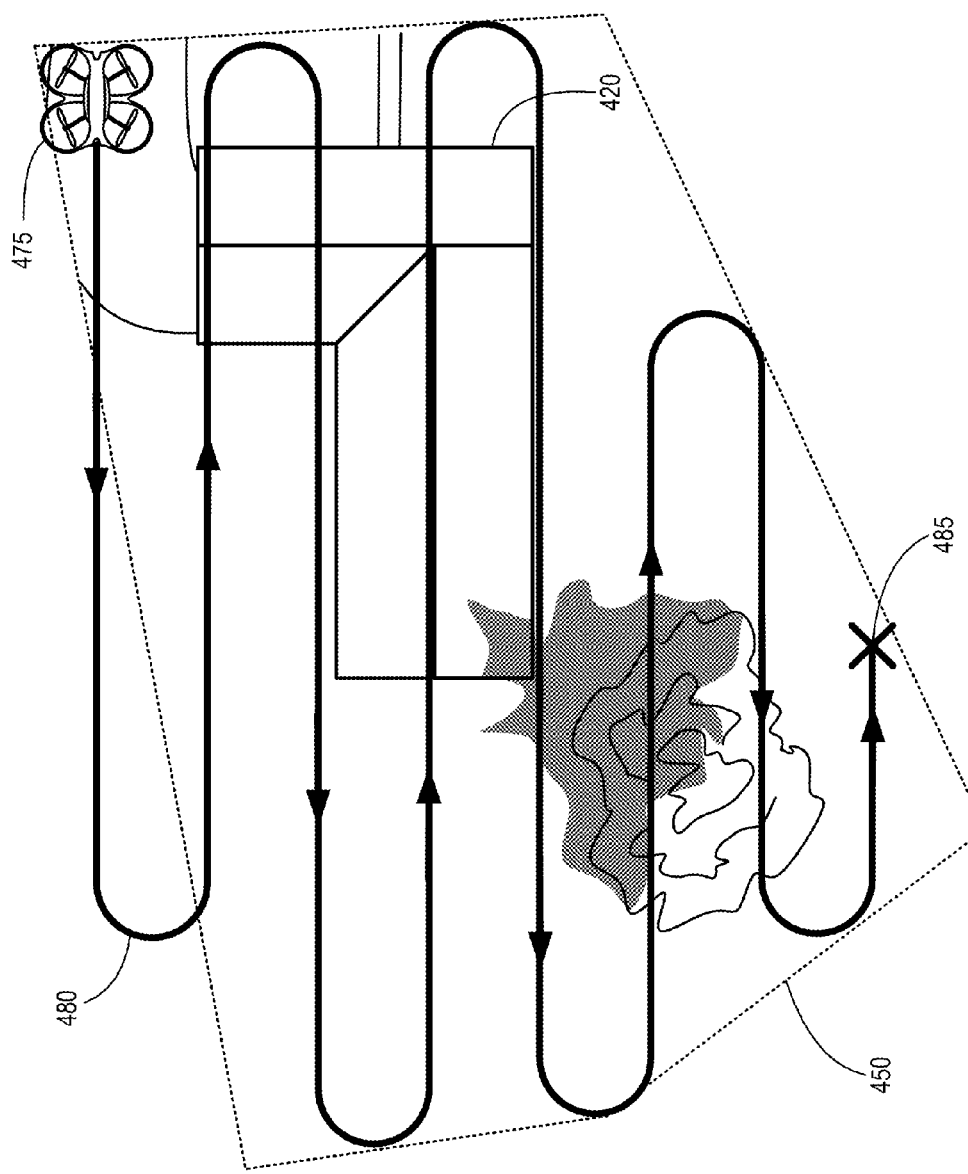
FIG. 4 illustrates a boustrophedonic scan of a site, according to one embodiment.

FIG. 4 illustrates a boustrophedonic scan of a site 450 defined by the identified geographic boundaries that include a structure 420. During the boustrophedonic scan, the UAV 475 may capture images while following a boustrophedonic flight pattern 480. For clarity, the number of passes shown is eight; however, the actual number of passes may vary based the size of the structure and/or property, on a desired resolution, camera field of view, camera resolution, height of the UAV 475 relative to the surface, and/or other characteristics of the desired scan, capabilities of the UAV 475, and attributes of the surface.

The UAV 475 may fly to a start location. The start location may be at a first corner of the site 450. The UAV 475 may then follow a straight path until a boundary line of the site 450 is reached. The UAV 475 may then turn and follow an offset path in the opposite direction. The UAV 475 may continue to travel back and forth until an end point 485 is reached and the entire site 450 has been traveled. The UAV 475 may travel at a high altitude such that it will not collide with any obstacle or structure and/or avoid obstacles in the path by going around or above them. During the flight, the UAV 475 may capture images. In some embodiments, onboard processing or cloud-based processing may be used to identify structures and obstacles. Alternatively, analysis may be conducted after scanning is complete and the UAV has returned home.

Figure 5:
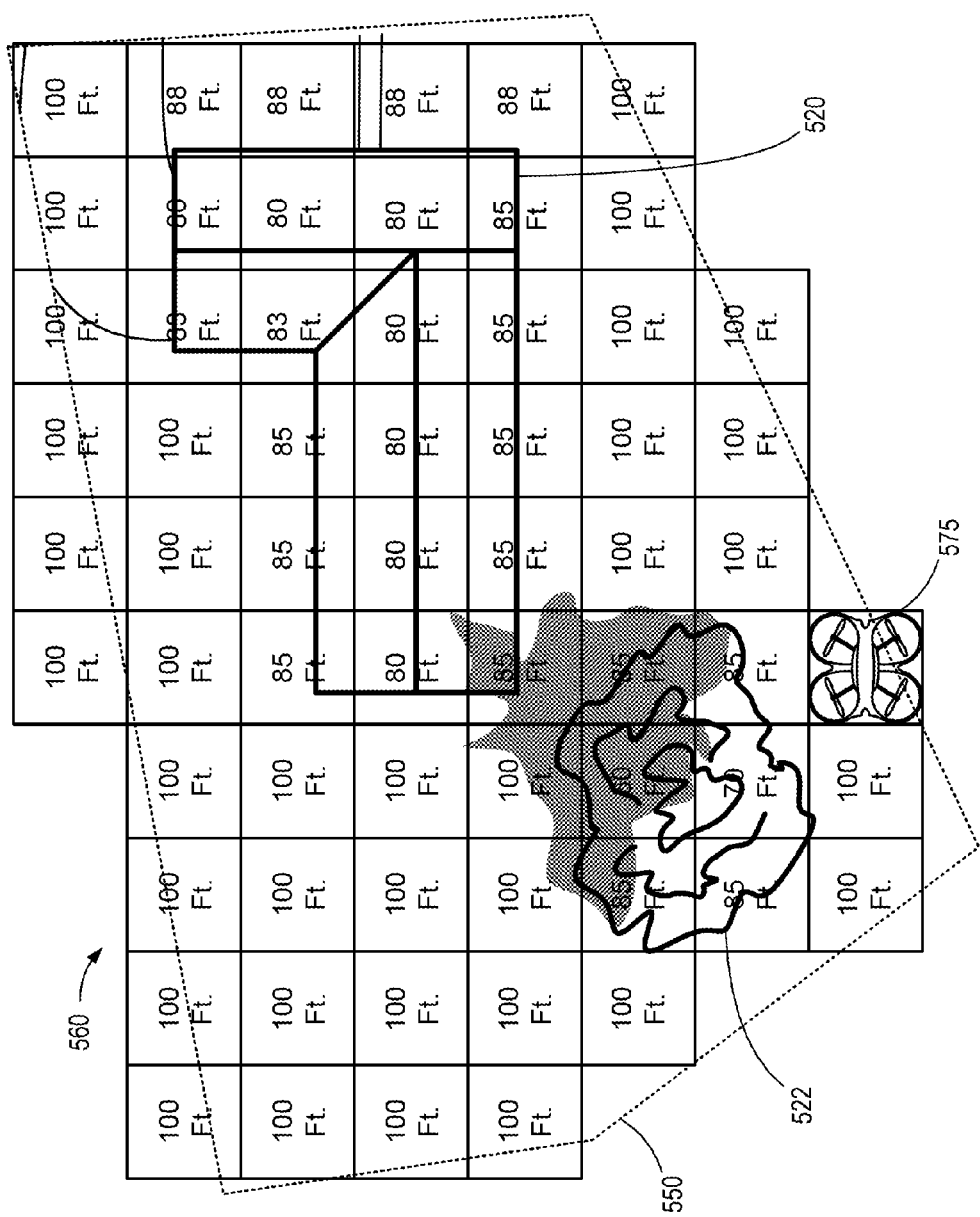
FIG. 5 illustrates an elevation map, according to one embodiment.

FIG. 5 illustrates an elevation map of a site 550 with a structure 520. As illustrated, a UAV 575 may map out the site 550 in a plurality of sub-locals 560 The UAV 575 may record the distances to a surface for each of the plurality of sub-locals 560 within the site 550. Each of the sub-locals 560 may correspond to potential vertical approaches for vertical descents during subsequent scans. The distances may be used to detect the location of a structure or any obstacles (e.g., tree 522) on the site 550. For example, the UAV 575 may determine the boundaries and relative location of a roof of the structure.

Figure 6A:
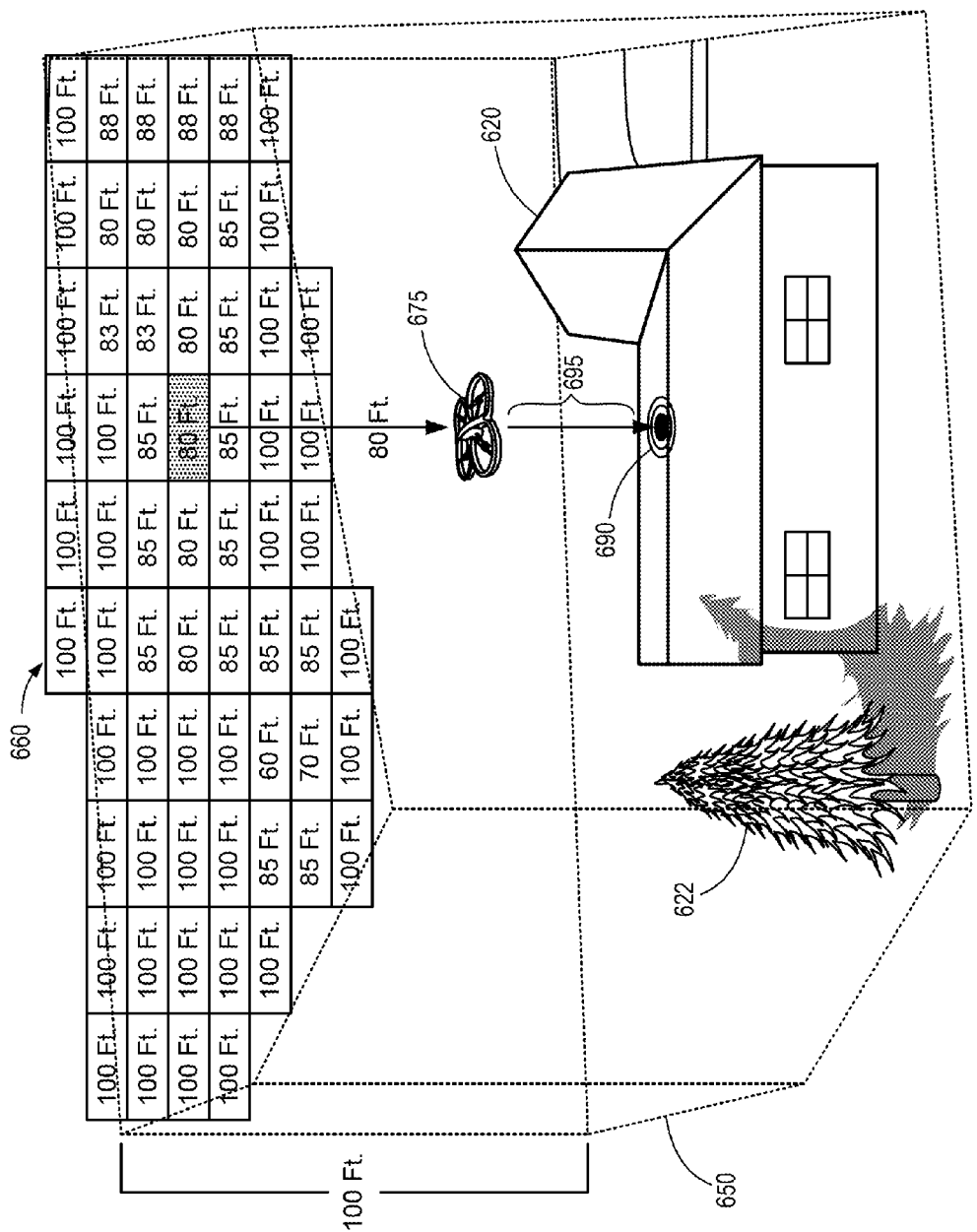
FIG. 6A illustrates an unmanned aerial vehicle (UAV) performing a micro scan of a site, according to one embodiment.

FIG. 6A illustrates a UAV 675 performing a micro scan of a site 650. As shown, the UAV 675 may make a series of vertical approaches for each sub-local 660. The UAV 675 may descend within each vertical approach to a target distance 695 and then capture a detailed image of a portion 690 of a structure 620. Some of the descents may culminate proximate a surface of the roof. Other descents may culminate proximate the ground and allow for imaging of a wall of the structure 620 as the UAV 675 descends proximate a wall of the structure 620.

In some embodiments, the entire site 650 may be micro scanned. In such an embodiment, the elevation map 560 from FIG. 5 may provide the height to obstacles 622 and the structure 620. The UAV 675 may determine the altitude change necessary to reach the target distance 695 for each sub-local 660 based on the elevation map 560.

In one embodiment, certain portions of the site 650 may be micro scanned while other portions are not. For example, the UAV 675 may not micro scan the obstacle 622. In another example, the UAV 675 may only micro scan the structure 620, or a certain portion 690 of the structure 620.

Figure 6B:
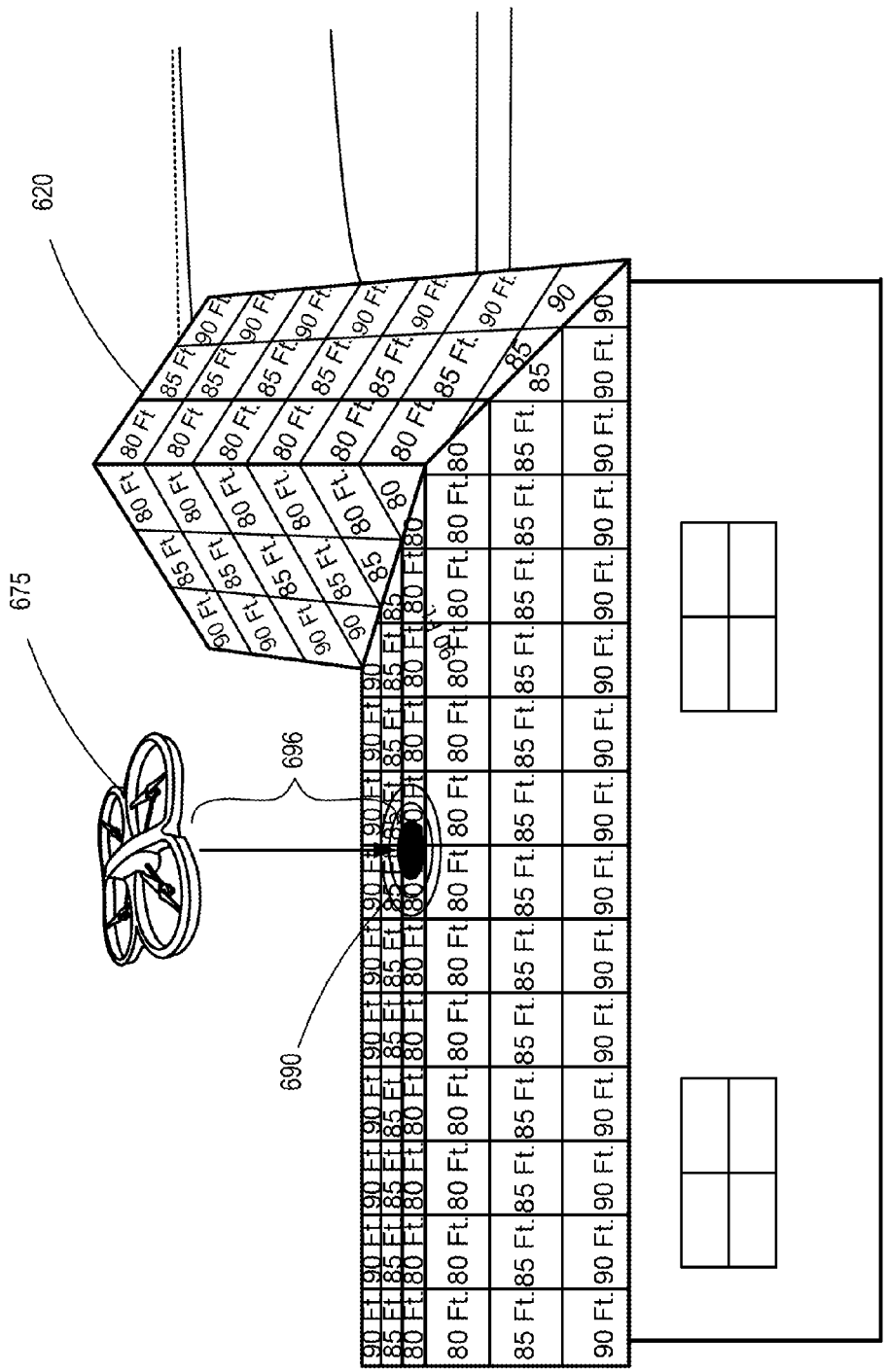
FIG. 6B illustrates a elevation map of structure to allow for micro scans or detailed scans to be performed from a consistent distance to each portion of the structure, according to one embodiment.

FIG. 6B illustrates an elevation map of the structure 620 to allow for micro scans or detailed scans to be performed from a consistent distance to each portion of the structure 620. The UAV 675 may descend within each vertical approach to within, for example, 15 feet of the structure 620 for detailed images and/or other analysis to be performed.

In some embodiments, the UAV, or associated cloud-based control systems, may identify a pitch of the roof before performing micro scans. In such embodiments and possibly in other embodiments, each descent within each vertical approach may be used to scan (or otherwise analyze or collect data) of a portion of the structure 620 that is not directly beneath the UAV 675. Such an approach may allow for skew-free data collection. In other embodiments, micro scans may be performed directly beneath, to the side, behind, and/or in front of the UAV 675 as it descends within each vertical approach.

Figure 7A:
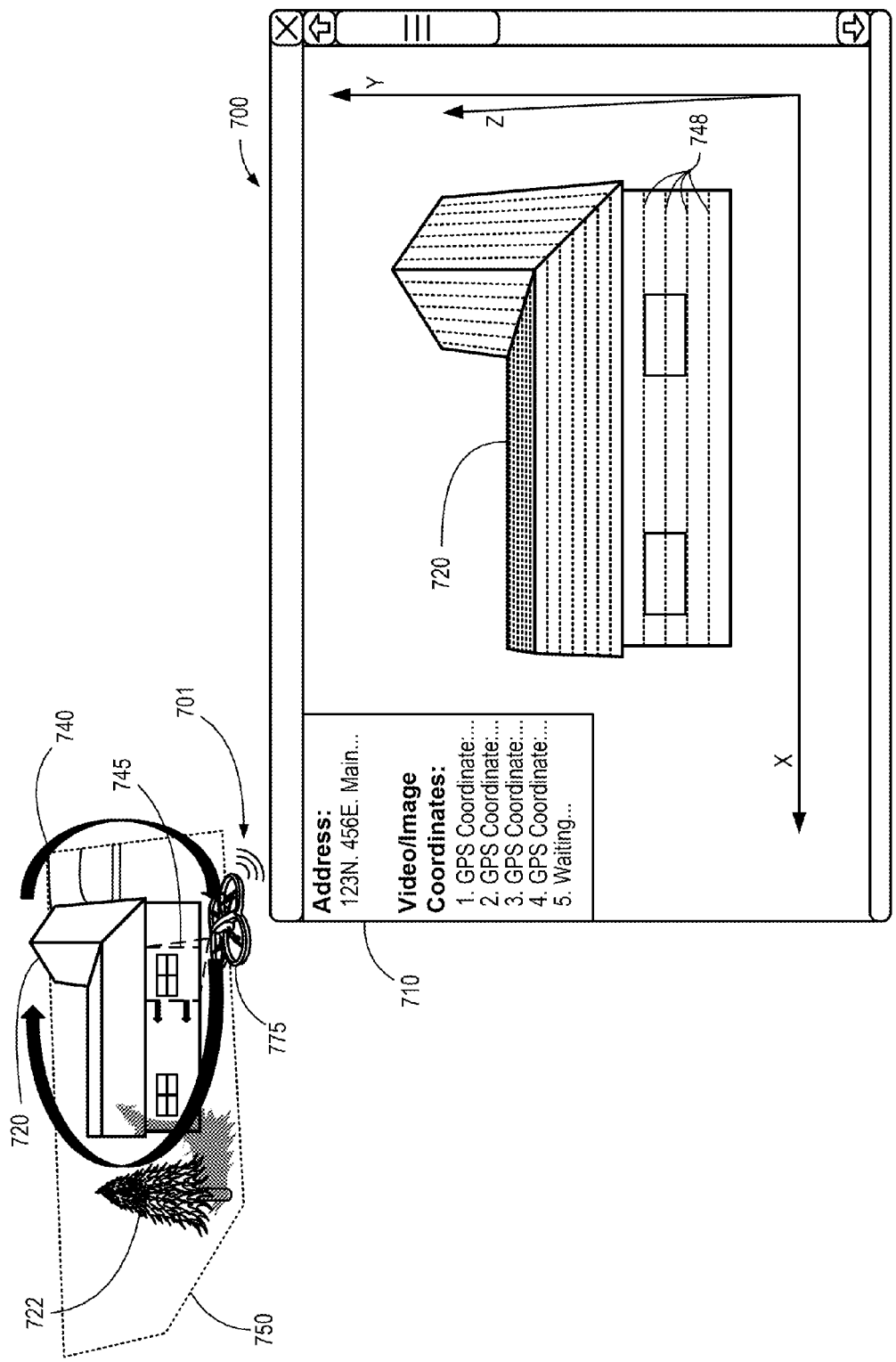
FIGS. 7A-C illustrate a loop scan and a model of a structure, according to one embodiment.
Figure 7B:
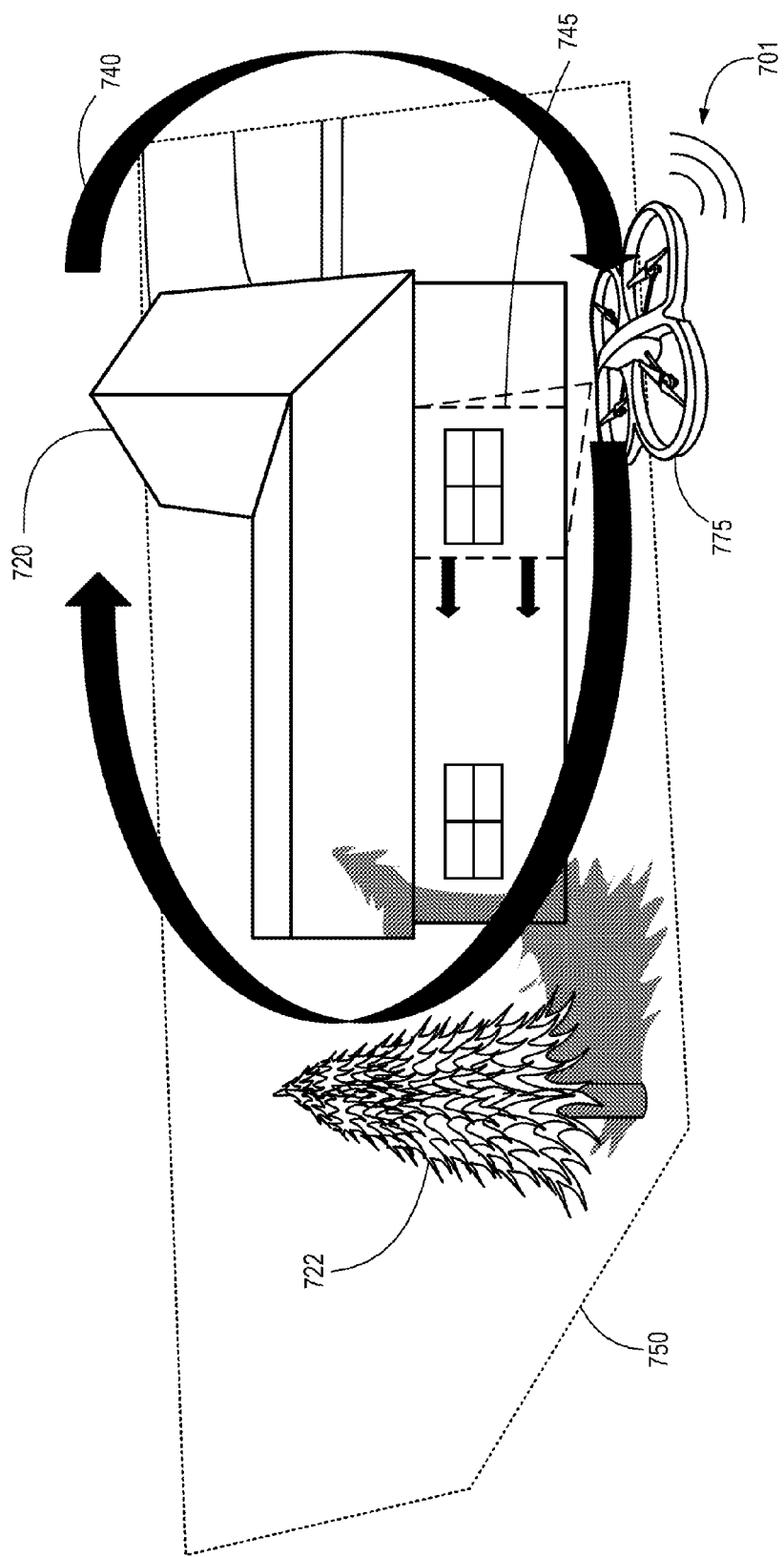
Figure 7C:
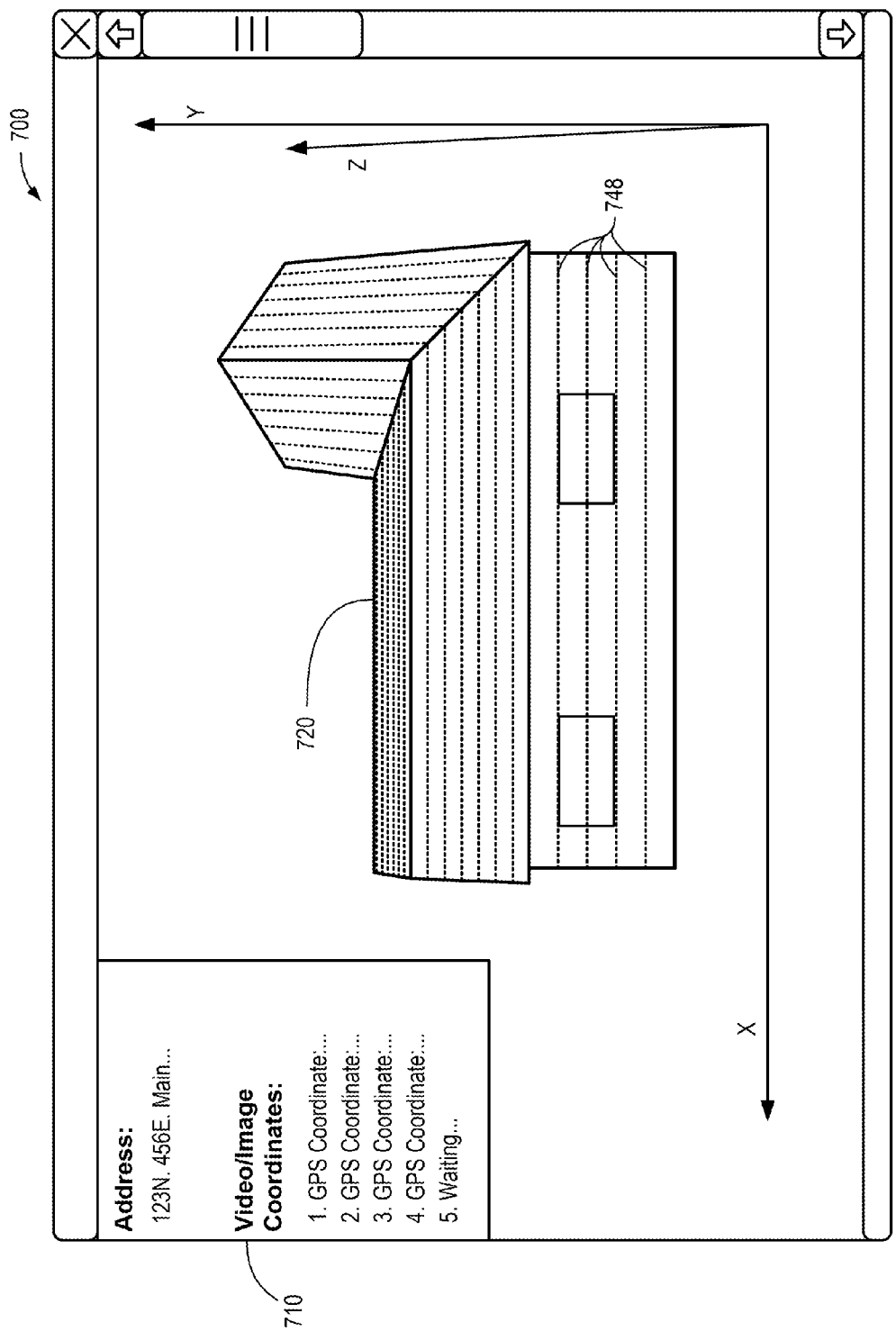

FIGS. 7A-7C illustrate a loop scan 701 and a three-dimensional model 700 of a structure 720 on a site 750. The loop scan 701 may take a series of angled images 745 of the walls 748 of the structure 720.

A UAV 775 may perform the loop scan 701 by following a second flight pattern 740 that causes the UAV 775 to travel around the perimeter of the structure 720 at a second altitude range lower than the altitude of the boustrophedonic scan.

By following a lower elevation, the UAV 775 captures images of the side of the structure 720. This may be used to create a higher resolution three-dimensional model 700.

Figure 8:
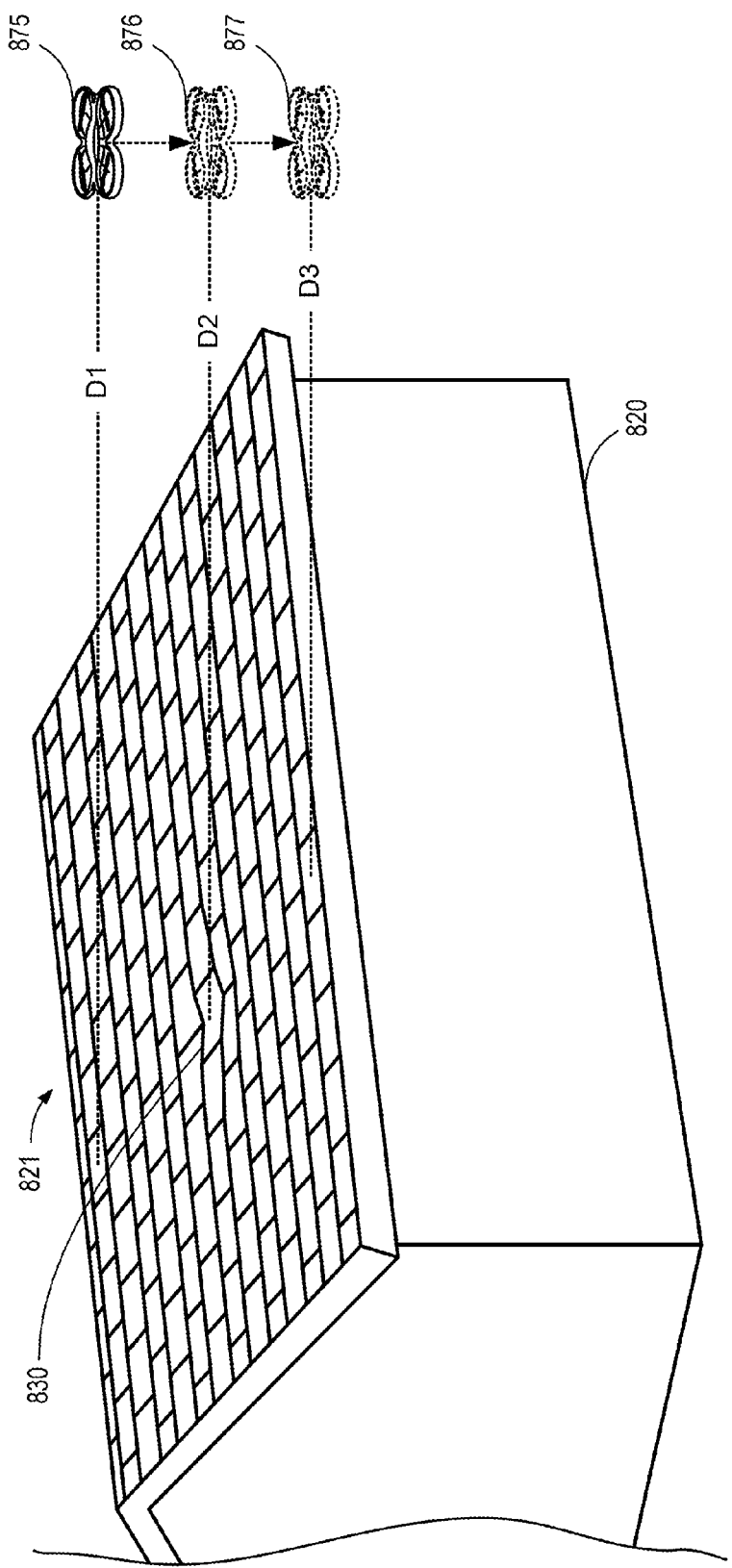
FIG. 8 illustrates a UAV determining a pitch of a roof, according to one embodiment.

FIG. 8 illustrates a UAV determining a pitch 821 of a roof of a structure. The UAV may capture three or more images of the roof: a first image at a first elevation 875, a second image at a second elevation 876, and a third image at a third elevation 877. The first and the second elevations 875, 876 may be below the roof peak. The third elevation 877 may be slightly above the rain gutters. The UAV may use these images along with associated meta data, including proximity data, to determine the pitch 821 of the roof.

The UAV may also detect inconsistencies 830 to the shingles on the roof. The inconsistencies 830 may be a sign of damage to the roof. The UAV may mark the inconsistency 830 as a portion of interest to micro scan.

In various embodiments, the UAV includes a propulsion system to move the UAV from a first aerial location to a second aerial location relative to a structure, as illustrated in FIG. 8. Movements may be horizontal, vertical, and/or a combination thereof. Lateral movements and rotation may also be possible. As previously described, the UAV may include one or more sensors that can be used, or possible are specifically configured to, determine distances to objects, such as a roof. The UAV may determine a distance to a roof at a first aerial location. The UAV may then move to a second aerial location along a movement vector that includes one or more directional components (e.g., up, down, left, right, back, and/or forward, which could be more generally described as vertical, horizontal, or lateral—or even described using an X, Y, and Z coordinate system). A distance to the roof may be calculated at the second aerial location. A pitch of the roof may be calculated (e.g., geometrically) based on the distance measurements at the first and second locations and at least one of the components of the movement vector.

Figure 9:
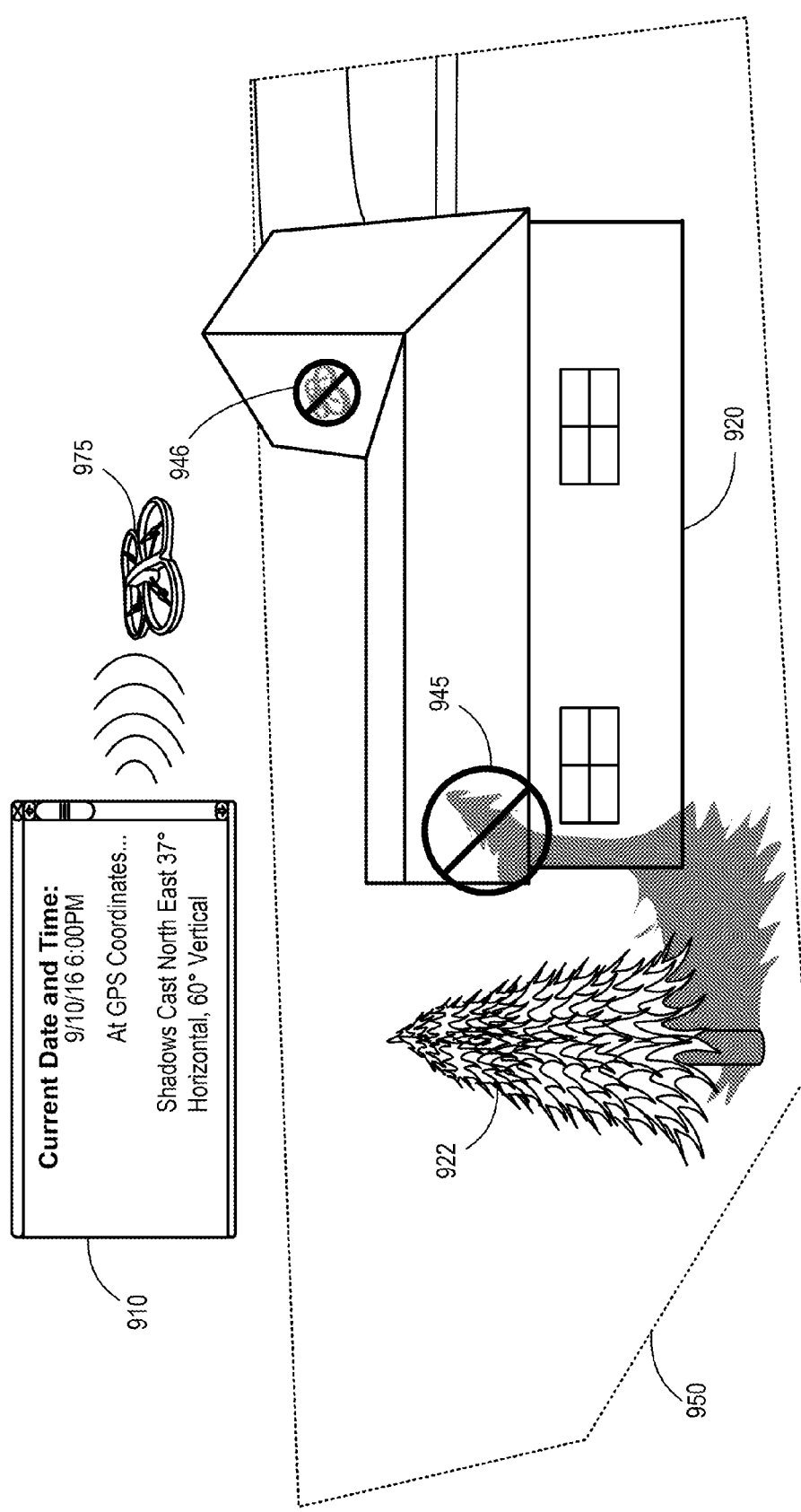
FIG. 9 illustrates a UAV assessment and reporting system using the date and time to identify and/or eliminate shadows in image captures, according to one embodiment.

FIG. 9 illustrates a UAV assessment and reporting system using the date and time 910 to identify and/or optionally eliminate shadows in image captures. As shown a UAV 975 may receive the current data and time 910. The UAV 975 may determine a shadow 945 of obstacles 922 on a site 950. The UAV 975 may refrain from taking images of the portion of a structure 920 covered by the shadow 945 of the obstacle 922, annotate or otherwise identify shadow 945, and/or take additional images at a subsequent time when the shadow 945 has moved. Further, the UAV 975 may determine a time when the shadow 945 will move away from the roof. The UAV assessment and reporting system using the date may also adjust the camera angle on the UAV 975 to avoid shadows 946 from the UAV 975.

Figure 10:
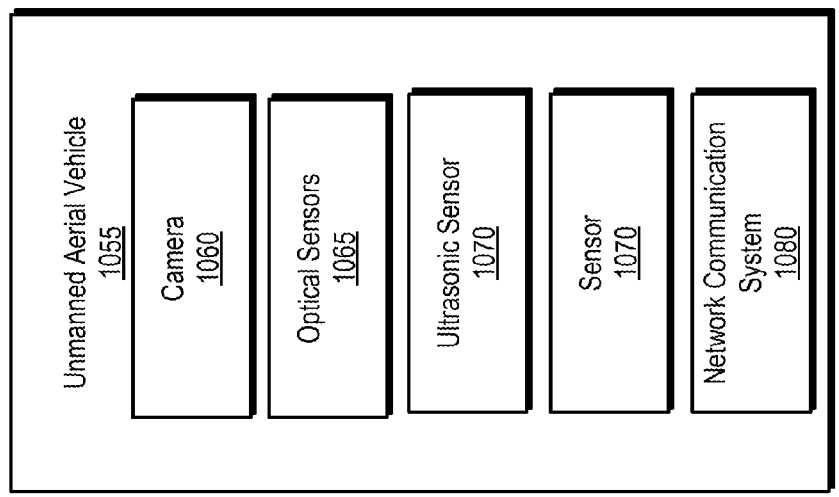
FIG. 10 illustrates a UAV assessment and reporting system for analyzing a structure, according to one embodiment.
Figure 10:
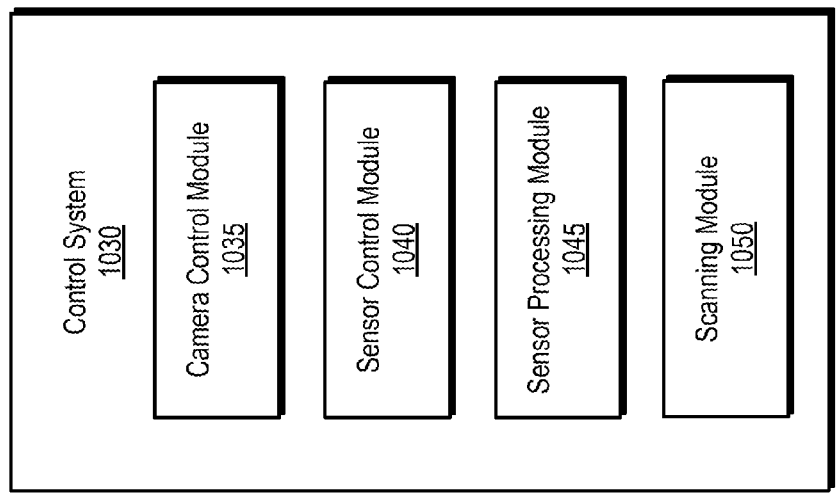
Figure 10:
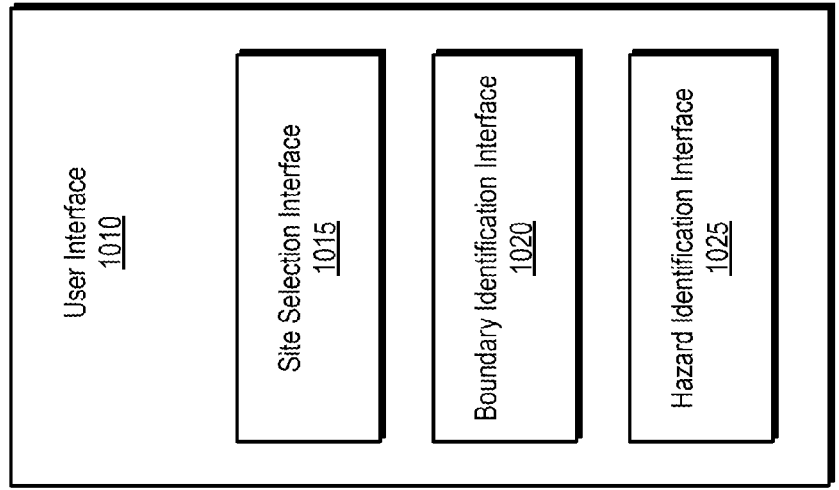

FIG. 10 illustrates an UAV assessment and reporting system for analyzing a structure, according to one embodiment. As illustrated, a user interface 1010 may include a site selection interface 1015 to receive an electronic input from an operator or other technician that identifies a location of a structure or other object to be assessed. The user interface 1010 may further include a boundary identification interface 1020 to receive user input identifying geographic boundaries of a site or lot containing a structure and/or of the structure itself. The user interface 1010 may additionally or optionally include a hazard identification interface 1025 allowing a user to identify one or more hazards proximate a structure or site identified using the site selection interface 1015.

A control system 1030 may be onboard a UAV 1055 or may be remote (e.g., cloud-based). The control system 1030 may provide instructions to the UAV 1055 to cause it to conduct an assessment. The control system 1030 may include a camera control module 1035, other sensor control modules 1040, image and/or sensor processing modules 1045, and/or scanning modules 1050 to implement boustrophedonic, loop, and/or micro scans. The UAV 1055 itself may include a camera 1060, one or more optical sensors 1065, ultrasonic sensors 1070, other sensors 1075, and one or more network communication systems 1080. FIG. 10 is merely representative of one example embodiment, and numerous variations and combinations are possible to implement the systems and methods described herein.

This disclosure has been made with reference to various embodiments, including the best mode. However, those skilled in the art will recognize that changes and modifications may be made to the embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element.

What is claimed is:

1. An unmanned aerial vehicle (UAV) assessment system for imaging a structure, comprising:
   a site selection user interface to receive an electronic input from a user identifying a location of a structure; and
   a UAV to receive the location of the structure from the site selection interface, the UAV comprising:
      a camera to capture images of a roof of the structure;
      a proximate object determination system to identify at least one object proximate the roof of the structure; and
      a shadow determination system to calculate a location of a shadow cast by the proximate object onto the structure based on a location of the sun at one or more times;
   an imaging system to account for the calculated shadow by annotating images of the structure captured by the camera that are calculated to include the shadow.

2. The UAV assessment system of claim 1, wherein the imaging system is part of the UAV, and wherein the imaging system is configured to account for the shadow in real-time during imaging by annotating images of the structure that include the calculated shadow at the one or more times.

3. The UAV assessment system of claim 1, wherein the imaging system is integrated within the UAV.

4. The UAV assessment system of claim 1, wherein the site selection user interface and the imaging system are embodied within one of mobile phone, a personal computer, and a tablet device.

5. The UAV assessment system of claim 1, further comprising:

a processor; and a non-transitory computer-readable medium for receiving and storing instructions that, when executed by the processor, cause the UAV to conduct a structural damage assessment, including:

a boustrophedonic scan of the site containing the structure, the boustrophedonic scan comprising a sequence of images captured during a boustrophedonic flight pattern within a first altitude range; and a micro scan of the structure in a second flight pattern that includes vertical approaches proximate the structure to capture detail images of the structure.

6. The UAV assessment system of claim 1, wherein the camera is configured to capture images of a roof of the structure with an optical axis of the camera aligned perpendicular to the plane of the roof of the structure by adjusting at least a tilt angle of the camera of the UAV.

7. The UAV assessment system of claim 1, wherein the object comprises a tree.

8. The UAV assessment system of claim 1, wherein the object comprises one of: a chimney and a skylight.

9. The UAV assessment system of claim 1, wherein the object comprises one of: a power line, a power pole, a tree, and a neighboring structure.

10. The UAV assessment system of claim 1, wherein the camera comprises at least one of an infrared camera, a visible-light camera, and an ultraviolet camera; and wherein the shadow comprises one of an infrared shadow, a visible-light shadow, and an ultraviolet shadow.

11. The UAV assessment system of claim 1, further comprising:

a pitch determination system to determine a pitch of a planar surface of the roof that is at an angle relative to a downward direction based on at least two distance measurements.

12. The UAV assessment system of claim 11, wherein the shadow determination system is further configured to calculate the location of a shadow cast by the proximate object onto the structure based on the determined pitch of the planar surface of the roof.

* * * * *